United States Patent
Stotts et al.

(10) Patent No.: US 10,183,629 B1
(45) Date of Patent: Jan. 22, 2019

(54) SYSTEM AND METHOD FOR RETROFITTING VEHICLES WITH ONBOARD MONITORING EQUIPMENT

(71) Applicant: Paul Stotts, Seattle, WA (US)

(72) Inventors: Paul Stotts, Seattle, WA (US); Nathan Stotts, Clearwater, FL (US)

(73) Assignee: Paul Stotts, Seattle, WA (US)

( * ) Notice: Subject to any disclaimer, the term of this patent is extended or adjusted under 35 U.S.C. 154(b) by 0 days.

(21) Appl. No.: 16/055,013

(22) Filed: Aug. 3, 2018

Related U.S. Application Data (63) Continuation of application No. 15/653,473, filed on Jul. 18, 2017, now Pat. No. 10,059,278.

(51) Int. Cl.
| | |
|---|---|
| *B60R 11/02* | (2006.01) |
| *B60R 16/03* | (2006.01) |
| *B60W 50/00* | (2006.01) |
| *H04L 12/40* | (2006.01) |

(52) U.S. Cl.
CPC .......... *B60R 11/02* (2013.01); *B60R 16/0315* (2013.01); *B60W 50/00* (2013.01); *H04L 2012/40215* (2013.01); *H04L 2012/40273* (2013.01)

(58) Field of Classification Search
USPC .......................................... 174/72 A; 138/156
See application file for complete search history.

(56) References Cited

U.S. PATENT DOCUMENTS

| | | | | |
|---|---|---|---|---|
| 727,786 A | * | 5/1903 | Grace | B65D 3/04 138/156 |
| 790,644 A | * | 5/1905 | Lloyd | B21D 39/04 138/156 |
| 1,185,014 A | * | 5/1916 | Shea | E04D 1/22 138/156 |
| 1,389,143 A | | 8/1921 | Kempton | |

(Continued)

OTHER PUBLICATIONS

"SAEJ1962: Diagnostic Connector Equivalent to ISO/DIS," available at https://law.resource.org/pub/us/cfr/ibr/005/sae.1962.1995.pdf, retrieved from Internet on Oct. 31, 2017, pp. 1-8.

(Continued)

*Primary Examiner* — William H Mayo, III
*Assistant Examiner* — Krystal Robinson
(74) *Attorney, Agent, or Firm* — Ellen M. Bierman; John J. Bamert; Lowe Graham Jones PLLC (57) ABSTRACT

Embodiments are directed to a cable harness. The cable harness may include a female connector, a male connector, main wires, and branch wires. The female connector and the male connector may each comply with a Society of Automotive Engineers (SAE) J1962 standard and may each have a plurality of pins. Each of the main wires may electrically couple a respective one of the pins of the male connector to a corresponding respective one of the pins of the female connector. Each of the branch wires may electrically couple to a respective one of the main wires via a respective T-splice. A first pair of the branch wires may provide a branch connection to a first Controller Area Network (CAN)

(Continued)

bus wire combination. A second pair of the branch wires may provide a branch connection to a second CAN bus wire combination.

20 Claims, 4 Drawing Sheets

(56) References Cited

U.S. PATENT DOCUMENTS

| | | | | |
|---|---|---|---|---|
| 4,214,147 | A | * | 7/1980 | Kraver .................. F28F 19/006 |
| | | | | 392/468 |
| 4,239,319 | A | | 12/1980 | Gladd et al. |
| 4,379,473 | A | * | 4/1983 | Kunze ..................... B29C 61/10 |
| | | | | 138/103 |
| 4,784,462 | A | | 11/1988 | Priaroggia |
| 4,874,908 | A | | 10/1989 | Johansson |
| 5,160,811 | A | * | 11/1992 | Ritzmann ................ F16L 3/015 |
| | | | | 138/121 |
| 5,789,711 | A | | 8/1998 | Gaeris et al. |
| 6,288,340 | B1 | | 9/2001 | Arnould |
| 6,596,944 | B1 | | 7/2003 | Clark et al. |
| 6,639,152 | B2 | | 10/2003 | Glew et al. |
| 6,687,437 | B1 | | 2/2004 | Starnes et al. |
| 6,800,811 | B1 | | 10/2004 | Boucino |
| 6,879,761 | B2 | | 4/2005 | Rogers |
| 7,173,189 | B1 | | 2/2007 | Hazy et al. |
| 7,696,438 | B2 | | 4/2010 | Clark et al. |
| 7,705,244 | B2 | | 4/2010 | Fok |
| 8,912,436 | B2 | | 12/2014 | Gabriel |
| 2005/0103518 | A1 | | 5/2005 | Glew |
| 2009/0198856 | A1 | | 8/2009 | Habben |
| 2010/0258333 | A1 | | 10/2010 | Horan et al. |
| 2014/0156167 | A1 | | 6/2014 | Lukaczyk et al. |
| 2018/0060267 | A1 | | 3/2018 | Sutton et al. |

OTHER PUBLICATIONS

"Screen print of SAE webpage for SAE Diagnostic Connector Starndard J1962," available at http://standards.sae.org/1962_201607/, retrieved from the Internet on Oct. 31, 2017, pp. 1-2.

* cited by examiner

SYSTEM AND METHOD FOR RETROFITTING VEHICLES WITH ONBOARD MONITORING EQUIPMENT

CROSS-REFERENCE TO RELATED APPLICATION

This application is a continuation of U.S. patent application Ser. No. 15/653,473, filed on Jul. 18, 2017, which application is incorporated herein by reference in its entirety.

TECHNICAL FIELD

The present invention relates generally to cable harnesses, and more particularly, but not exclusively, to cable harnesses in an in-vehicle environment.

BACKGROUND

Many vehicles have in-vehicle networks that facilitate communication with various subsystems or subsystem controllers in the vehicles. Aftermarket electronic devices often provide enhanced functionality when connected to the in-vehicle network of a given vehicle. Attempting to connect aftermarket electronic devices to in-vehicle networks presents risks of human error. Moreover, connecting aftermarket electronic devices to in-vehicle networks can result in unsightly wire management or interference with the ability to connect diagnostic tools to the in-vehicle networks. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Various Embodiments, which is to be read in association with the accompanying drawings, wherein.

DETAILED DESCRIPTION OF THE VARIOUS EMBODIMENTS

The following briefly describes embodiments of the invention to provide a basic understanding of some aspects of the invention. This brief description is not intended as an extensive overview. It is not intended to identify key or critical elements or to delineate or otherwise narrow the scope. Its purpose is merely to present come concepts in a simplified form as a prelude to the more detailed description that is presented later.

Briefly stated, various portions of the present innovations are directed to a cable harness that includes a male connector, a female connector, main wires, and branch wires. The main wires may electrically couple, with a one-to-one relationship, pins in the female connector to corresponding respective pins in the male connector. The branch wires may electrically couple, with a one-to-one relationship, to various respective main wires via T-splices in the main wires. The branch wires may provide a branch end-of-network connection to a bus according to a pinout definition and may also provide a branch end-of-network connection to the bus according to a different pinout definition.

For example, a first pair of the branch wires may electrically couple to a first pair of the main wires via a first pair of T-splices in the first pair of main wires while a second pair of the branch wires may electrically couple to a second pair of the main wires via a second pair of T-splices in the second pair of main wires. In platforms that employ a first pinout definition, the first pair of main wires may electrically couple to a bus. In other platforms that employ a second pinout definition, the second pair of main wires may electrically couple to the bus. Accordingly, the cable harness can be universally installed in different platforms that employ different pinout definitions while universally providing branch end-of-network connections in the different platforms. Moreover, aftermarket electronic devices can be connected to a network in any one of the different platforms via the branch end-of-network connections without interfering with the ability to electrically couple a diagnostic tool to the main end-of-network connections provided by the female connector.

Employing the cable harness may also reduce the likelihood of human error when attempting to connect aftermarket electronic devices to a network in any one of the different platforms. For example, without the cable harness, a user may attempt to tap into wires on a network side of a factory-installed female connector in a vehicle to connect an aftermarket electronic device to a Controller Area Network (CAN) bus or another source (for example, power supply or the like) in the vehicle. In doing so, the user may cause damage to one or more portions of the vehicle or the aftermarket electronic device. For example, the user may tap into the wrong wires, tap into the correct wires yet flip-flop which is which, break one or more connections from the network to the factory-installed connector, or the like. In contrast, with the male connector of the cable harness plugged into the factory-installed female connector in the vehicle, the cable harness provides branch connections on the opposite side of the factory-installed female connector from the network. Moreover, the branch connections in the cable harness may be clearly labeled. Accordingly, at least because the cable harness provides branch connections to a network in a given platform without cutting or splicing into any wires on the network side of a factory-installed or otherwise already-existing connector, the cable harness may reduce the likelihood of human error when attempting to connect aftermarket electronic devices to the network in the platform.

Illustrative Operating Environment

The present innovations may be implemented in any environment where different pinout definitions may be used across various platforms. One example is an automobile environment. In the automobile environment, many vehicles include in-vehicle networks that have end-of-network connections that provide access to the in-vehicle networks. For example, onboard diagnostic (OBD) systems can provide a user (for example, a vehicle owner or a technician) access to the statuses of various vehicle subsystems. Vehicles with OBD systems often include factory-installed end-of-network connectors to facilitate such access.

Modern vehicles often include factory-installed female connectors (for example, data link connectors (DLC)) as end-of-network connectors that adhere to a standard known as "OBD II." In modern vehicles (for example, vehicles manufactured after 1996), the factory-installed female connectors are typically located on the driver side of vehicles, under the instrument panels.

The Society of Automotive Engineers (SAE) J1962 specification defines two standardized hardware interfaces for OBD II connectors: i) type A and ii) type B. Both type A and type B are 16-pin (2×8), D-shaped connectors. Female SAE J1962 connectors include a groove between the two rows of pins. Type B female connectors include a groove interrupt in the middle of the connector face, between the two rows of pins, preventing insertion of a type A male connector into a type B female connector. A type B male connector, however, can be inserted into a type A female connector.

The standard of the hardware interface for the OBD II connector does not usually influence the pinout definitions of the connector. Instead, the SAE J1962 specification specifies options for pinout definitions of the OBD II connector independent of the hardware interface type (type A or type B). SAE J1962 specifies options for pinout definitions by specifying pinout definition options for respective pin numbers (pin numbers 1-16). SAE J1962 specifies that some pin numbers have pinout definitions that remain constant across all vehicles. For example, pin 4 should always be chassis ground while pin 5 should always be signal ground, and pin 16 should always be battery voltage (for example: 12 volts and 4 amps for type A connectors; 24 volts and 2 amps for type B connectors). SAE J1962 also specifies that some pin numbers have pinout definitions that can be assigned according to vehicle manufacturers' discretion. Accordingly, some pinout definitions for factory-installed OBD II connectors vary across years, manufacturers, or models of different vehicles.

For example, OBD II connectors often provide end-of-network connections to Controller Area Network (CAN) buses in vehicles via different pin numbers based on the different pinout definitions for different years, manufacturers, or models of different vehicles. In the automotive environment, CAN buses can facilitate communication with various subsystems in vehicles, such as transmission, airbag, antilock brake, cruise control, electric power steering, audio, power window, door, mirror adjustment, battery, or other subsystems. At least because different vehicles may employ different pinout definitions associated with the vehicles' CAN buses, attempting to connect aftermarket electronic devices (for example, collision avoidance systems such as one or more of displays, camera systems, autonomous driving systems, semi-autonomous driving systems, or the like) to the CAN buses can lead to human error. Moreover, plugging an aftermarket electronic device into an OBD II connector in a vehicle precludes connecting a diagnostic tool to the OBD II connector while the aftermarket electronic device remains connected to the CAN bus of the vehicle. Accordingly, various aspects of the present innovations address issues such as these and others.

Illustrative Implementation

Figure 1:
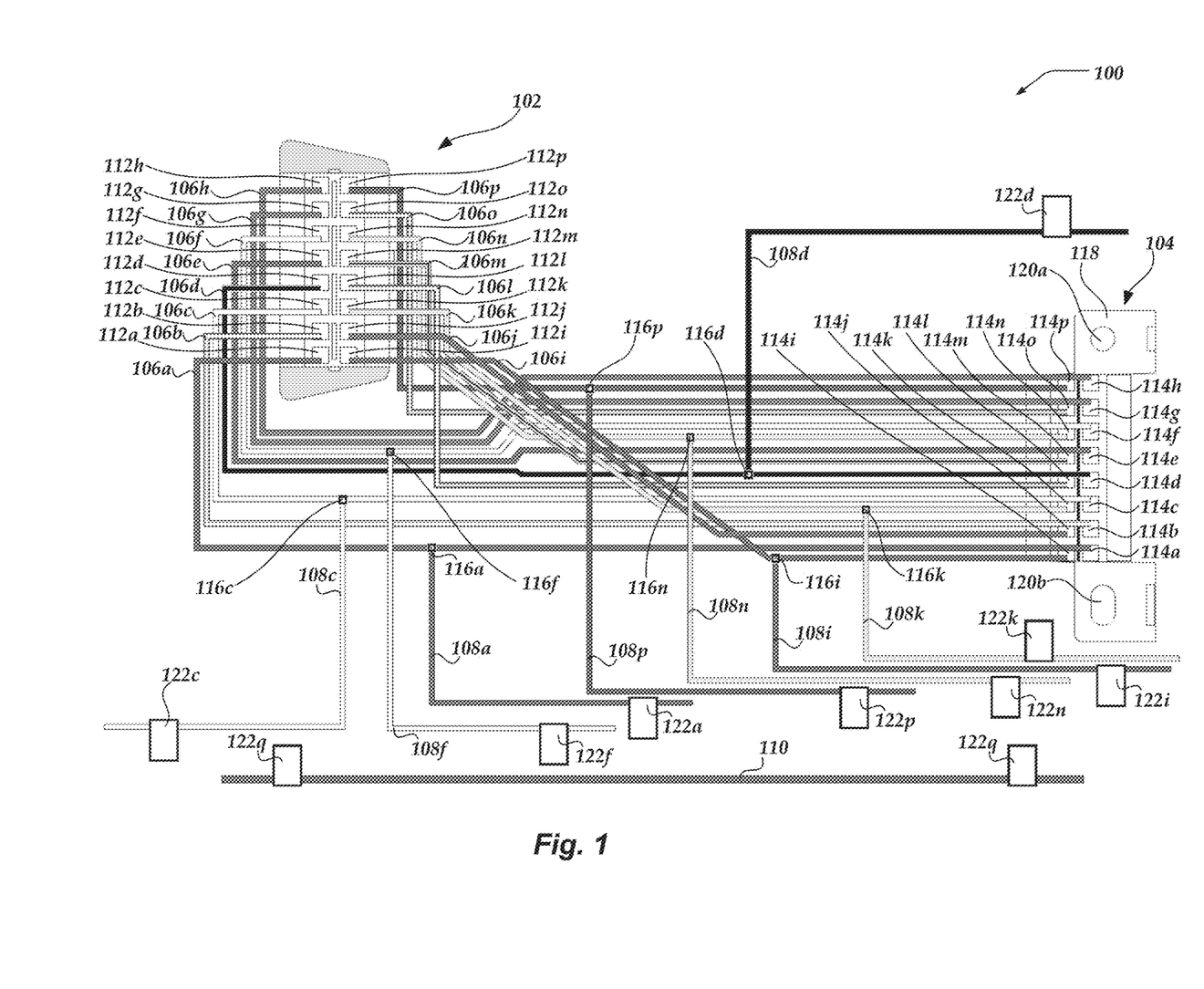
FIG. 1 illustrates a schematic representation of an example cable harness.

FIG. 1 illustrates a schematic representation of cable harness 100. Cable harness 100 includes male connector 102, female connector 104, main wires 106, and branch wires 108. In some implementations, cable harness 100 also includes one or more supplemental wires 110.

Male connector 102 may include one or more wire connection mechanisms, such as pins 112. Female connector 104 may also include one or more wire connection mechanisms, such as pins 114. In some examples, male connector 102 may have the same or a different number of pins 112 as compared to the number of pins 114 in female connector 104. For example, male connector 102 may be a type A or type B connector as specified by the SAE J1962 specification, and female connector 102 may be the same or a different type of connector as male connector 102 (for example, a type A or type B connector as specified by the SAE J1962 specification).

One or more pins 114 in female connector 104 may correspond, with a one-to-one relationship, to one or more pins 112 in male connector 102. In the example illustrated in FIG. 1, each pin 114 in female connector 104 corresponds to one respective pin 112 in male connector 102. In other example implementations, one or more pins 114 in female connector 104 may not correspond to any of pins 112 in male connector 102. For example, one or more pins 114 in female connector 104 may correspond to an alternative source that may not be electrically coupled to female connector 102, such as a Universal Serial Bus (USB) port, an Ethernet port, a FireWire port, another single-wire or multiple-wire connection to another device (for example, an after-market sensor, gauge, or the like), or the like.

In the example illustrated in FIG. 1, male connector 102 includes 16 pins 112a-112p, and female connector 104 includes 16 pins 114a-114p. In some example implementations, for each letter in the reference characters used herein for a given one of pins 112 or pins 114, the numerical position of the letter in the modern English alphabet may correspond to an associated pin number for an OBD II connector. For example, pins 112a and 114a may correspond to pin 1 in OBD II connectors, pins 112h and 114h may correspond to pin 8 in OBD II connectors, pins 112i and 114i may correspond to pin 9 in OBD II connectors, and pins 112p and 114p may correspond to pin 16 in OBD II connectors.

Figure 2:
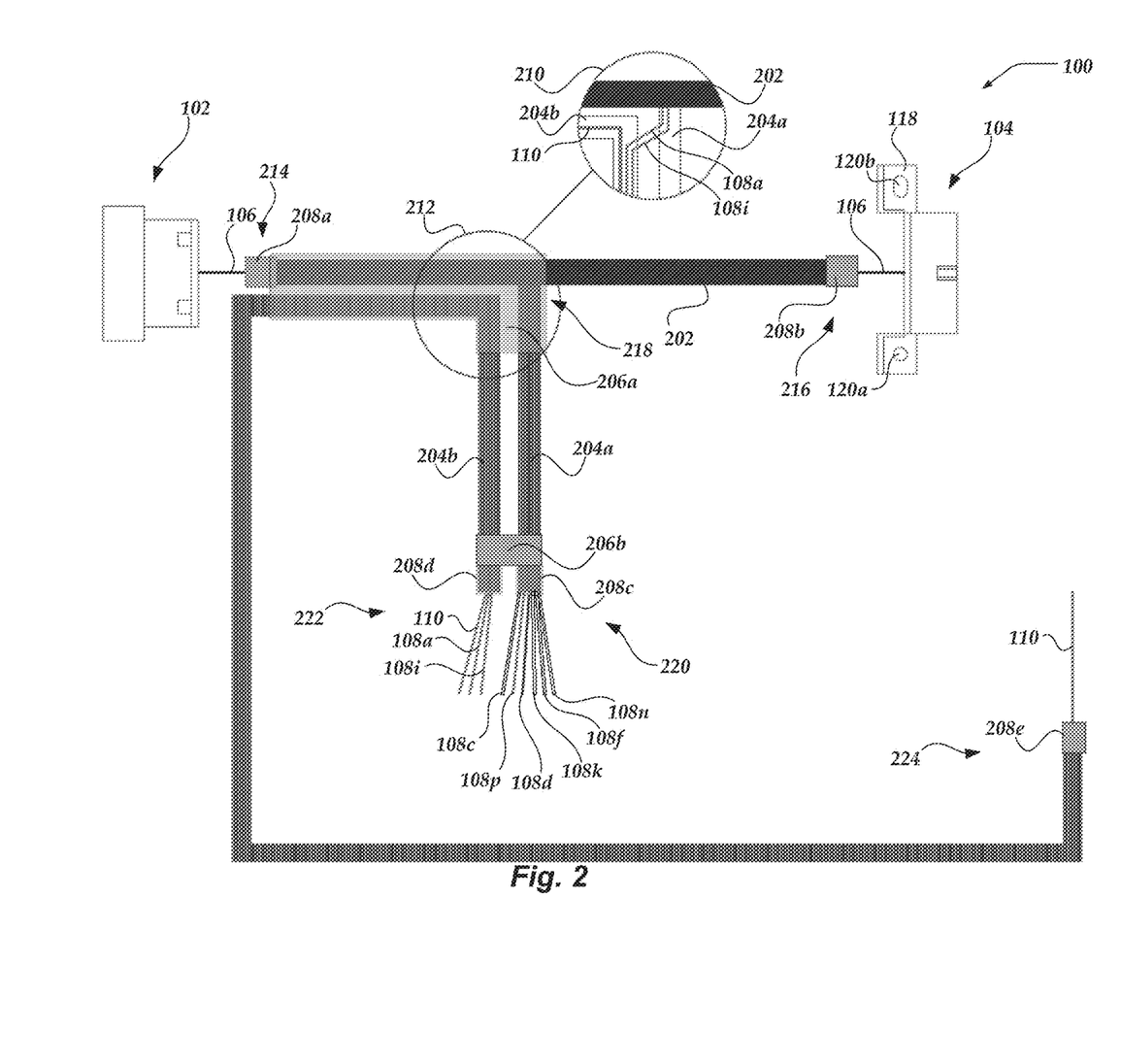
FIG. 2 shows a schematic representation of the cable harness of FIG. 1 with example tubular structures housing portions of the cable harness.

One or more of main wires 106 electrically couple one or more respective pins 112 in male connector 102 at the proximal end portion of main wires 106 (corresponding to proximal end portion 214 of main tubular structure 202 in FIG. 2) to a corresponding respective one or more of pins 114 in female connector 104 at the distal end portion of main wires 106 (corresponding to distal end portion 216 of main tubular structure 202 in FIG. 2). In the example illustrated in FIG. 1, cable harness 100 includes 16 main wires 106a-106p, each corresponding to a respective one of pins 112a-112p in male connector 102 and to a respective one of pins 114a-114p in female connector 104. Accordingly, inserting male connector 102 into another female connector (for example, a factory-installed OBD II female connector) electrically couples one or more of pins 114 in female connector 104 to one or more pins in the other female connector, thereby facilitating plugging an electronic device or a diagnostic tool into female connector 104 instead of directly into the other female connector.

One or more of branch wires 108 electrically couple to one or more respective main wires 106 via one or more respective T-splices 116. T-splices 116 may be disposed at the junction end portions of branch wires 108 (corresponding to branch-junction end portion 218 of branch tubular structure 204a in FIG. 2), opposite from the access end portions of branch wires 108 (corresponding to branch-access end portion 220 of branch tubular structure 204a or supplemental-access end portion 222 of tubular structure 204b in FIG. 2). One or more of T-splices 116 may include one or more of twisted wire ends, solder, heat shrink, electrical tape (for example, electrical tape available under the brand Super 33+™ or SCOTCH®), cloth tape (for example, cloth tape available under the brand TESA®), clamps, or the like. Accordingly, cable harness 100 facilitates connecting one or more devices via one or more branch connections provided at the access end portions of branch wires 108 while another device or diagnostic tool connects to female connector 104.

Cable harness 100 may include fewer branch wires 108 than main wires 106. In the example illustrated in FIG. 1, cable harness 100 includes eight T-splices 116a (for example, corresponding to pin 1), 116c (for example, corresponding to pin 3), 116d (for example, corresponding to pin 4), 116f (for example, corresponding to pin 6), 116i (for example, corresponding to pin 9), 116k (for example, corresponding to pin 11), 116n (for example, corresponding to pin 14), and 116p (for example, corresponding to pin 16) that electrically couple, with a one-to-one relationship, eight branch wires 108a (for example, corresponding to pin 1), 108c (for example, corresponding to pin 3), 108d (for example, corresponding to pin 4), 108f (for example, corresponding to pin 6), 108i (for example, corresponding to pin 9), 108k (for example, corresponding to pin 11), 108n (for example, corresponding to pin 14), and 108p (for example, corresponding to pin 16) to eight respective main wires 106a (for example, corresponding to pin 1), 106c (for example, corresponding to pin 3), 106d (for example, corresponding to pin 4), 106f (for example, corresponding to pin 6), 106i (for example, corresponding to pin 9), 106k (for example, corresponding to pin 11), 106n (for example, corresponding to pin 14), and 106p (for example, corresponding to pin 16). In other example implementations, cable harness 100 may include more or fewer branch wires 108 or T-splices 116 than the number shown in FIG. 1. In some examples, cable harness 100 may include branch wires 108 and T-splices 116 that are electrically coupled to different combinations of main wires 106 than the combinations shown in FIG. 1. For example, cable harness 100 may include a branch wire that electrically couples via a T-splice to main wire 106e in addition or alternative to branch wire 108d electrically coupling via T-splice 116d to main wire 106d.

In some example implementations, branch wires 108 may provide branch connections that can be employed in the alternative to each other or for different purposes based on the environment in which cable harness 100 is disposed. In a vehicle environment, for example, a first vehicle may employ one pinout definition for a factory-installed female connector as an end-of-network connection to the first vehicle's in-vehicle network, whereas a second vehicle may employ a different pinout definition in a female connector as an end-of-network connection to the second vehicle's in-vehicle network. In this example, cable harness 100 may include i) a branch wire 108 that is electrically coupled to a main wire 106 that would be electrically coupled to a given pinout when disposed in the first vehicle and ii) another branch wire 108 that is electrically coupled to another main wire 106 that would be electrically coupled to the given pinout when disposed in the second vehicle. Accordingly, branch wires 108 may provide branch connections associated with a given pinout for multiple different pinout definitions, thereby facilitating universal branch connections in a variety of environments with different pinout definitions.

In some example implementations, cable harness 100 may provide end-of-network branch connections to CAN buses of vehicles with different pinout definitions. Considering the two-vehicle example above, when male connector 102 of cable harness 100 is inserted into the female connector of the first vehicle, pin 112f in male connector 102 may electrically couple to a high output of the first vehicle's CAN bus while pin 112n in male connector 102 electrically couples to a low output of the first vehicle's CAN bus. Also in this example, when male connector 102 of cable harness 100 is inserted into the female connector of the second vehicle, pin 112c in male connector 102 may electrically couple to a high output of the second vehicle's CAN bus while pin 112k in male connector 102 electrically couples to a low output of the second vehicle's CAN bus. Accordingly, main wires 106f, 106n may be a first CAN bus wire combination (for example, when cable harness 100 is disposed in the first vehicle) while main wires 106c, 106k may be a second CAN bus wire combination (for example, when cable harness 100 is disposed in the second vehicle). In the example illustrated in FIG. 1, cable harness 100 includes a first pair of branch wires 108f, 108n that provides a branch connection to the first CAN bus wire combination and includes a second pair of branch wires 108c, 108k that provides a branch connection to the second CAN bus wire combination. Accordingly, as shown in FIG. 1, cable harness 100 provides end-of-network branch connections to the CAN buses of both the first and second vehicles, thereby facilitating universal installation of cable harness 100 into either the first vehicle or the second vehicle.

A third vehicle may use a one-wire CAN bus. For example, when male connector 102 of cable harness 100 is inserted into a female connector of the third vehicle, pin 112a in male connector 102 may electrically couple to an output of the third vehicle's CAN bus. Accordingly, in the example illustrated in FIG. 1, cable harness 100 includes branch wire 108a that provides a branch connection to main wire 106a as the CAN bus wire combination for the third vehicle. In other vehicles, branch wire 108a may provide an ignition output to permit a diagnostic tool to determine the state of the ignition. Accordingly, in this example, the branch connection provided by branch wire 108a can serve different purposes based on the vehicle in which cable harness 100 is disposed.

Cable harness 100 may include one or more fuse holders disposed, for example, at the access end portions of one or more of branch wires 108. For example, cable harness 100 may include fuse holders at the access end portions of branch wires 108a, 108i. Accordingly, in environments where one or more of branch wires 108a, 108i provide branch constant-voltage connections (for example, constant-12-volt connections, constant-24-volt connections, or the like), such as an ignition output, each constant-voltage connection provide overcurrent protection with a replaceable fuse held in the appropriate fuse holder.

In the example illustrated in FIG. 1, cable harness 100 includes mounting plate 118 removably coupled to female connector 104. Mounting plate 118 may have screw holes 120a, 120b or another mechanism, such as tabs, clamps, or the like, to facilitate mounting female connector 104 at a desired location. For example, a factory-installed female connector in a vehicle can be displaced to a concealed location while female connector 104 is mounted via mounting plate 118 at the original location of the factory-installed female connector.

Cable harness 100 may include labels 122 that identify the branch connection provided by each branch wire 108 or the supplemental connection provided by each supplemental wire 110. For example, label 122a may display a pin number of pin 112a in male connector 102 or pin 114a in female connector 104 to indicate the branch connection provided by branch wire 108a. In the example illustrated in FIG. 1, labels 122c, 122d, 122f, 122i, 122k, 122n, or 122p may likewise display respective pin numbers of pins 112c, 112d, 112f, 112i, 112k, 112n, or 112p in male connector 102 or pins 114c, 114d, 114f, 114i, 114k, 114n, or 114p in female connector 104 to indicate the respective branch connections provided by branch wires 108c, 108d, 108f, 108i, 108k, 108n, or 108p. Also in the example, illustrated in FIG. 1, label 122q may display "IGN" to indicate that supplemental wire 110 may provide a supplemental connection to an ignition output. Labels 122 may be disposed, for example, at the access end portions of branch wires 108 or supplemental wires 110. In some example implementations, a label 122 may also be disposed at supplemental junction end portion of each supplemental wire 110. For example, each supplemental wire 110 may lack immediate mechanical coupling to any of pins 112 in male connector 102 and to any of pins 114 in female connector 114 to permit electrically coupling each end of each supplemental wire 110 to another source or destination.

FIG. 2 shows a schematic representation of cable harness 100 with main tubular structure 202, branch tubular structure 204a, and supplemental tubular structure 204b housing portions of cable harness 100. Main tubular structure 202 may entirely or partially house one or more of main wires 106. Branch tubular structure 204a may entirely or partially house one or more of branch wires 108. Supplemental tubular structure 204b may entirely or partially house one or more supplemental wires 110. In some example implementations, one or more of tubular structures 202, 204a, 204b may be omitted. For example, one or more of main wires 106, branch wires 108, or supplemental wires 110 may not be covered. As another example, one or more of tubular structures 202, 204a, 204b may entirely or partially house two or more of main wires 106, branch wires 108, or supplemental wires 110.

Tubular structures 202, 204a, 204b may include one or more of split or corrugated loom tubing, braided sleeving, wiring ducts, wiring raceways or runways, cloth tapes (for example, cloth tape available under the brand TESA®), electrical tape (for example, electrical tape available under the brand Super 33+™ or SCOTCH®), protective wraps, heat shrink tubing, or the like to facilitate wire management and protection of main wires 106, branch wires 108, or supplemental wires 110. Tubular structures 202, 204a, 204b may include one or more materials, such as nylon, silicone rubber, fiberglass, basalt fiber, another plastic or rubber material, or the like.

One or more of tubular structures 202, 204a, 204b may have diameters of at least 0.25, 0.5, 0.75, 1, 1.25, or 1.5 inches or longitudinal lengths of 0.5, 1, 2, 3, 4, 5, 6, 12, 24, 36, 72, 108, 132, or more inches. In some example implementations, one or more of tubular structures 202, 204a, 204b may have different diameters or longitudinal lengths than another one or more of tubular structures 202, 204a, 204b. For example, main tubular structure 202 may have a longitudinal length of 6.5 inches while branch tubular structure 204a has a longitudinal length of 4.75 inches, and supplemental tubular structure 404b has a longitudinal length of 137 inches.

One or more of main wires 106 may have the same longitudinal length or different longitudinal lengths than main tubular structure 202. As shown in FIG. 2, for example, main wires 106 extend beyond both proximal end portion 214 (male-connector end portion) and distal end portion 216 (female-connector end portion) of main tubular structure 202. In other examples, main tubular structure 202 may extend to or at least partially overlap one or more of male connector 102 or female connector 104.

One or more of branch wires 108 may have longitudinal lengths that exceed the longitudinal length of branch tubular structure 204a. For example, one or more of branch wires 108 may have sufficient longitudinal lengths to extend from the branch-junction end portion 218 of branch tubular structure 204a to 0.5, 1, 2, 3, 4, 5, 6, or more inches beyond branch-access end portion 220 of branch tubular structure 204a. One or more supplemental wires 110 may have longitudinal lengths that are sufficient to extend beyond both ends of supplemental tubular structure 204b. For example, one or more supplemental wires 110 may extend 0.5, 1, 2, 3, 4, 5, 6, or more inches beyond supplemental-access end portion 222 of supplemental tubular structure 204b and 0.5, 1, 2, 3, 4, 5, 6, or more inches beyond supplemental junction end portion 224 of supplemental tubular structure 204b. One or more supplemental wires 110 may extend the same or different amounts beyond supplemental-access end portion 222 and supplemental junction end 224 of the supplemental tubular structure 204b. For example, the end of one or more supplemental wires 110 may extend 4 inches beyond supplemental-access end portion 222 of the supplemental tubular structure 204b while the other end of one or more supplemental wires 110 extends 3 inches beyond supplemental-junction end portion 224 of the supplemental tubular structure 204b.

Cable harness 100 may include one or more securing structures 206a, 206b that secure two or more of tubular structures 202, 204a, 204b to each other. As shown in FIG. 2, securing structure 206a secures proximal end portion 214 of main tubular structure 202 to branch-junction end portion 218 of branch tubular structure 204a and a middle portion of supplemental tubular structure 204b. In this example, securing structure 206a also secures branch-junction end portion 218 of branch tubular structure 204a to the middle portion of supplemental tubular structure 204b. As also shown in FIG. 2, securing structure 206b secures branch-access end portion 220 of branch tubular structure 204a to supplemental-access portion 222 of supplemental tubular structure 204b. One or more of securing structures 206a, 206b may include one or more of braided sleeving, cloth tapes (for example, cloth tape available under the brand TESA®), electrical tape (for example, electrical tape available under the brand Super 33+™ or SCOTCH®), protective wraps, cable ties, heat shrink tubing, or the like.

Cable harness 100 may include one or more tubular-end terminators 208a, 208b, 208c, 208d, 208e disposed at one or more ends of tubular structures 202, 204a, 204b. Tubular-end terminators 208a, 208b, 208c, 208d, 208e may protect main wires 206, branch wires 208, or supplemental wires 210 from chafing by tubular structures 202, 204a, 204b. Additionally or alternatively, tubular-end terminators 208a, 208b, 208c, 208d, 208e may secure the longitudinal positions or the rotational orientations of tubular structures 202, 204a, 204b relative to main wires 206, branch wires 208, or supplemental wires 210. In some example implementations, one or more of tubular-end terminators 208a, 208b, 208c, 208d, 208e may mechanically couple one or more ends of tubular structures 202, 204a, 204b to one or more of main wires 206, branch wires 208, or supplemental wires 210. In some examples, one or more of tubular-end terminators 208a, 208b may mechanically couple one or more ends of tubular structure 202 to one or more of male connector 102 or female connector 104. One or more of tubular-end terminators 208a, 208b, 208c, 208d, 208e may include one or more of electrical tape (for example, electrical tape available under the brand Super 33+™ or SCOTCH®), cloth tape (for example, cloth tape available under the brand TESA®), cable ties, protective wraps, heat shrink tubing, or the like.

In the example shown in FIG. 2, branch wires 108 extend from main tubular structure 202 immediately into branch-junction end portion 218 of branch tubular structure 204a. In other examples, branch tubular structure 204a may be spaced apart from main tubular structure 202 or separated from main tubular structure 202 by a joint structure, such as a tee fitting. One or more of branch wires 108 may extend entirely through branch tubular structure 204a. In the example shown in FIG. 2, branch wires 108c, 108d, 108f, 108k, 108n, 108p extend through branch-access end portion 220 of branch tubular structure 204a, whereas branch wires 108a, 108i extend through supplemental-access end portion 222 of supplemental tubular structure 204b. For example, as shown in circle 210 (showing a partially-transparent view of the portion of cable harness 100 highlighted by circle 212), one or more branch wires 108 (for example, branch wires 108a, 108i) may extend from main tubular structure 202, into branch-junction end portion 218 of branch tubular structure 204a, to a middle portion of supplemental tubular structure 204b, and through supplemental-access end portion 222 of supplemental tubular structure 204b. In other examples, one or more branch wires 108 (for example, branch wires 108a, 108i) may extend from main tubular structure 202 directly into the middle portion of supplemental tubular structure 204b, instead of through branch-junction end portion 218 of branch tubular structure 204a.

In some example implementations, cable harness 100 includes one or more connectors (for example, pin-and-socket connectors available under the brand MOLEX®, mate-n-lok connectors available under the brand AMP®, or the like) disposed at the access end portions of one or more of branch wires 108 or supplemental wires 110. For example, a first pair of branch wires 108 disposed adjacent to each other in a connector may provide a branch connection to a first CAN bus wire combination while a second pair of branch wires 108 disposed adjacent to each other in the connector may provide a branch connection to a second CAN bus wire combination.

In some example implementations, two or more branch wires 108 may provide a branch connection to the same main wire 106 (via the same or different T-splices 116). For example, cable harness 100 may include two instances of branch wire 108p to provide multiple branch constant-voltage connections. Main wires 106, branch wires 108, or supplemental wires 110 may have any wire gauge suitable for the application, such as 18, 22, 14, 16, 10, or 12 gauge wire.

Figure 3:
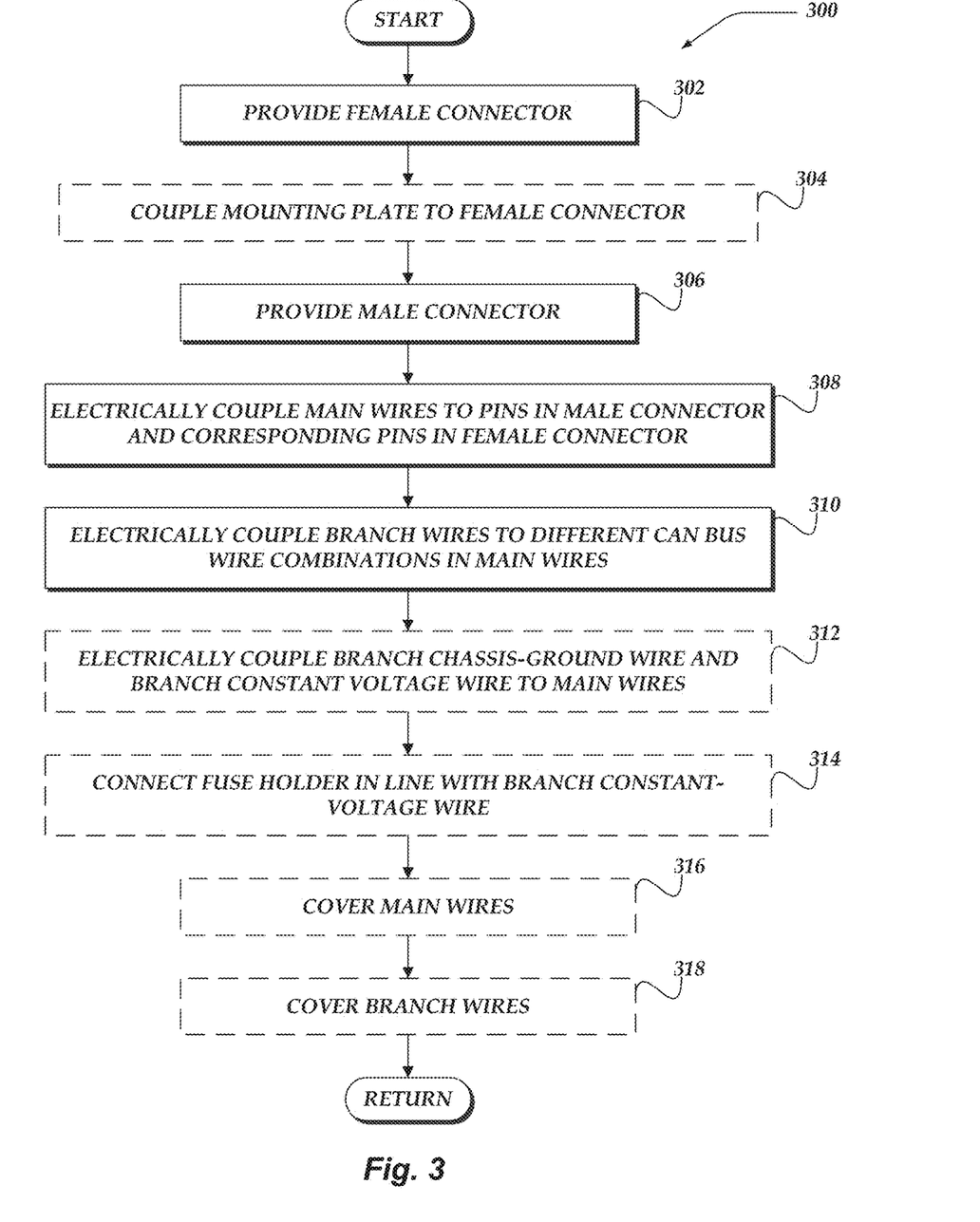
FIG. 3 illustrates an overview flowchart of an exemplary process for making the cable harness of FIG. 1.

FIG. 3 illustrates an overview flowchart of process 300 for making one or more cable harnesses, such as cable harness 100. After a start block, at block 302, a female connector, such as female connector 104, may be provided. The female connector may adhere to a standard used in the environment in which the cable harness is intended to be installed. For example, where the cable harness is intended to be installed in a vehicle, the female connector be an OBD II female connector.

At block 304, a mounting plate, such as mounting plate 118, may be coupled to the female connector. Block 304 is optional because some environments may not implement a mounting plate for mounting the female connector at a given position in the environment. Alternatively, the mounting plate may be coupled to the female connector regardless of whether the mounting plate may be used in the environment. For example, the mounting plate may be removably coupled to the female connector, thereby permitting the cable harness to be installed in environments that do or do not utilize the mounting plate.

At block 306, a male connector, such as female connector 102, may be provided. The male connector may adhere to the same standard or a different standard than the female connector. In some example implementations, the male connector may be an OBD II male connector.

At block 308, main wires, such as main wires 106, may be electrically coupled, with a one-to-one relationship, to respective wire connection mechanisms in the male connector (for example, pins 112) and to corresponding respective wire connection mechanisms (for example, pins 114) in the female connector.

At block 310, branch wires, such as branch wires 108, may be electrically coupled, with a one-to-one relationship, to respective main wires via respective T-splices. In some example implementations, different pairs of the branch wires (for example, branch wire pair 108f, 108n, branch wire pair 108c, 108k, or the like) may provide respective branch connections to respective network wire combinations, such as respective CAN bus wire combinations. In some examples, a single branch wire (for example, branch wire 108a) may provide another branch connection to another network wire, such as another CAN bus wire. Accordingly, a single cable harness can be manufactured for multiple environments that each adhere to respectively different pinout combinations while the cable harness provides branch connections to desired network wires (for example, CAN bus wires) regardless of the environment in which the cable harness is eventually installed.

At block 312, one or more branch ground wires (for example, branch wire 108d) and branch constant voltage wires (for example, one or more of branch wires 108i, 108p) may be electrically coupled to the main wires. This step is optional because the cable harness may lack one or more of branch ground wires or branch constant voltage wires. Additionally or alternatively, this block may be executed as part of block 310.

At block 314, one or more fuse holders may be connected in line with one or more branch wires, such as one or more constant-voltage wires (for example, one or more of branch wires 108a, 108i). This block is optional because cable harness may lack fuse holders or even branch constant-voltage wires altogether.

At block 316, one or more of the main wires may be entirely or partially covered. For example, one or more tubular structures (for example, main tubular structure 202), securing structures (for example, securing structure 206a), tubular-end terminators (for example, one or more of tubular-end terminators 208a, 208b), or the like may entirely or partially cover one or more of the main wires. This block is optional because the cable harness may lack additional coverage of the main wires beyond insulation on the main wires.

In block 318, one or more of the branch wires may be entirely or partially covered. For example, one or more tubular structures (for example, one or more of branch tubular structure 204a or supplemental tubular structure 204b), securing structures (for example, one or more of securing structures 206a, 206b), tubular-end terminators (for example, one or more of tubular-end terminators 208c, 208d), or the like may entirely or partially cover one or more of the branch wires. Additionally or alternatively, one or more of the supplemental wires may be entirely or partially covered. For example, one or more tubular structures (for example, supplemental tubular structure 204b), securing structures (for example, one or more of securing structures 206a, 206b), tubular-end terminators (for example, one or more of tubular-end terminators 208d, 208e), or the like may entirely or partially cover one or more of the branch wires. This block is optional because the cable harness may lack additional coverage of the branch wires or supplemental wires beyond insulation on the main wires.

In some implementations, process 300 may be manually performed or partially or fully automated. Accordingly, process 300 may continue operating until a user configures process 300 to terminate operation. Next, control may be returned to a calling process.

Figure 4:
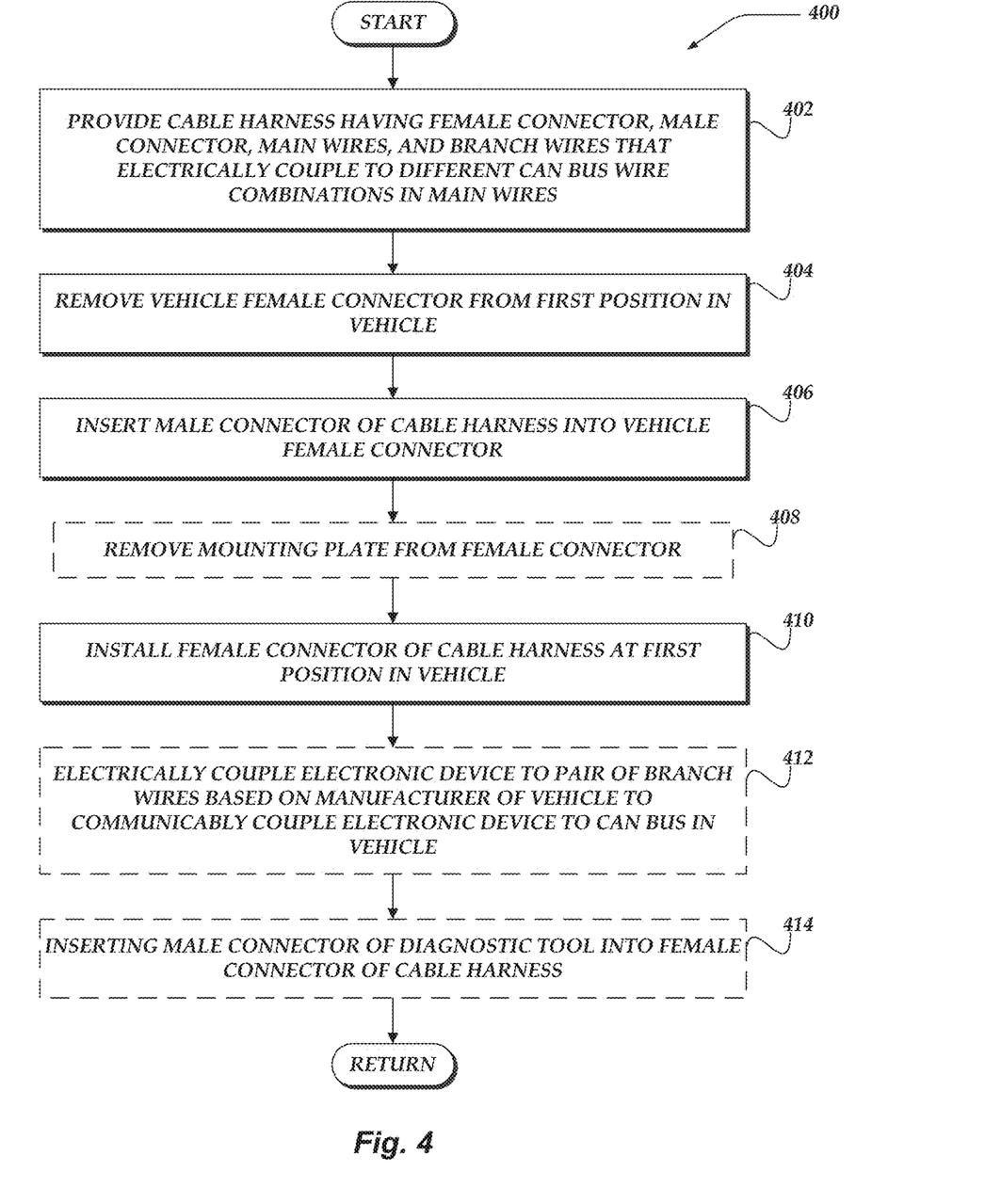
FIG. 4 shows an overview flow diagram of an exemplary process for using the cable harness of FIG. 1.

FIG. 4 shows an overview flow diagram of process 400 for using a cable harness, such as cable harness 100. After a start block, at block 402, a cable harness (for example, cable harness 100) having one or more female connectors (for example, female connector 104), male connectors (for example, male connector 102), main wires (for example, main wires 106), and branch wires (for example, branch wires 108) may be provided. In some example implementations, the male connector and the female connector may adhere to the same standard, such as OBD II. In some examples, the branch wires may provide branch connections associated with a given pinout for multiple different pinout definitions, thereby facilitating universal branch connections in a variety of environments with different pinout definitions. For example, different pairs of the branch wires (for example, branch wire pair 108f, 108n, branch wire pair 108c, 108k, or the like) may provide respective branch connections to respective network wire combinations, such as respective CAN bus wire combinations, in the main wires. In some examples, a single branch wire (for example, branch wire 108a) may provide another branch connection to another network wire, such as another CAN bus wire, in the main wires.

At block 404, another female connector (for example, a factory-installed end-of-network female connector, such as a factory-installed OBD II female connector in a vehicle) may be removed from a first position (for example, the other female connector's original position in a vehicle).

At block 406, the male connector of the cable harness may be inserted into the other female connector.

At block 408, a mounting plate (for example, mounting plate 118) of the female connector of the cable harness may be removed. For example, the first position may employ different fastening mechanisms than the mounting plate or may obstruct disposing the female connector of the cable harness at the first position with the mounting plate still attached. This block is optional because some environments may employ the same fastening mechanisms as the mounting plate or may not obstruct disposing the female connector of the cable harness at the first position with the mounting plate still attached.

At block 410, the female connector of the cable harness may be installed at the first position of the other female connector. In some example implementations, the other female connector may not have been removed from the first position. In those example implementations, the female connector of the cable harness may be installed next to or near the other female connector (for example, at a position within reach of the cable harness).

At block 412, one or more electronic devices may be electrically coupled to one or more of the branch wires based on the pinout definition to which the other female connector adheres. In some example implementations, the one or more electronic devices may be electrically coupled to a pair of the branch wires that provide a branch connection to a network wire combination for the environment in which the cable harness is disposed. For example, different pairs of the branch wires (for example, branch wire pair 108f, 108n, branch wire pair 108c, 108k, or the like) may provide respective branch connections to respective network wire combinations, such as respective CAN bus wire combinations, in the main wires. In some examples, a single branch wire (for example, branch wire 108a) may provide another branch connection to another network wire, such as another CAN bus wire, in the main wires. In some examples, vehicles of different years, makes, or models may adhere to different pinout definitions. Accordingly, in these examples, the selection or purpose of the branch wires may be chosen based on one or more of a given vehicle's year, manufacturer, or model. In some example implementations, the branch wires may be labeled to facilitate simple selection of the branch wires that provide the desired connections for a user's vehicle based on the year, manufacturer, or model of the user's vehicle. Accordingly, one or more electronic devices can utilize one or more end-of-network connections provided by the branch wires without obstructing the female connector of the cable harness and without a cable harness that is customized for the pinout definition employed in the particular environment into which the cable harness is installed. This block is optional because the cable harness may be installed without electrically coupling an electronic device to the cable harness and, instead, merely employing the branch wires as optional connections for potential device installations that may occur in the future.

At block 414, a male connector of a tool (for example, a diagnostic tool) may be inserted into the female connector of the cable harness. For example, in a vehicle environment, the tool may be an OBD scan tool. Accordingly, because the cable harness includes the branch wires that provide the end-of-network branch connections, the tool may be inserted into the female connector of the cable harness without disabling one or more devices connected to via the cable harness or without disconnecting the one or more devices from the cable harness. This block is optional because a tool may never be inserted into male connector (for example, vehicles registered in certain counties may never undergo emissions testing). Next, control may be returned to a calling process.

It will be understood that one or more blocks of the flowchart illustrations, and combinations of blocks in the flowchart illustrations, can be implemented by computer program instructions. These program instructions may be provided to one or more processors to produce a machine, such that the instructions, which execute on the one or more processors, create means for implementing the actions specified in the flowchart block or blocks. The computer program instructions may be executed by the one or more processors to cause a series of operational steps to be performed by the one or more processors to produce a computer-implemented process such that the instructions, which execute on the one or more processors to provide steps for implementing the actions specified in the flowchart block or blocks. The computer program instructions may also cause at least some of the operational steps shown in the blocks of the flowchart to be performed in parallel or concurrently by the one or more processors or one or more computers. Moreover, some of the steps may also be performed across more than one processor or computer. In addition, one or more blocks or combinations of blocks in the flowchart illustrations may also be performed concurrently with other blocks or combinations of blocks or even in a different sequence than illustrated without departing from the scope or spirit of the invention.

Accordingly, blocks of the flowchart illustrations support combinations of means for performing the specified actions, combinations of steps for performing the specified actions, and program instruction means for performing the specified actions. It will also be understood that each block of the flowchart illustrations, and combinations of blocks in the flowchart illustrations, can be implemented by special purpose hardware based systems, which perform the specified actions or steps, or combinations of special purpose hardware and computer instructions. The foregoing examples should not be construed as limiting or exhaustive, but rather, illustrative use cases to show example implementations of at least one of the various embodiments of the invention.

Further, in one or more embodiments (not shown in the figures), the logic in the illustrative flowcharts may be executed using one or more embedded logic hardware devices instead of one or more CPUs, such as an Application Specific Integrated Circuits (ASICs), Field Programmable Gate Arrays (FPGAs), Programmable Array Logic chips (PALs), or the like, or combination thereof. The embedded one or more logic hardware devices may directly execute their embedded logic to perform actions. In at least one embodiment, one or more microcontrollers may be arranged as system-on-a-chip (SOCs) to directly execute their own locally embedded logic to perform actions and access their own internal memory and their own external Input and Output Interfaces (e.g., hardware pins and/or wireless transceivers) to perform actions described herein.

Various examples have been described above with reference to the accompanying drawings, which form a part hereof, and which show, by way of illustration, specific example embodiments by which the invention may be practiced. The embodiments may, however, be embodied in many different forms and should not be construed as limited to the examples set forth herein; rather, these examples are provided so that this disclosure will be thorough and complete and will fully convey the scope of the embodiments to those skilled in the art. Among other things, the various embodiments may be methods, systems, or devices. The present detailed description is, therefore, not to be taken in a limiting sense.

Throughout the specification and claims, the following terms take the meanings explicitly associated herein, unless the context clearly dictates otherwise. The phrase "in one embodiment," "in one example," or "in one implementation" as used herein does not necessarily refer to the same embodiment, though it may. Furthermore, the phrase "in another embodiment," "in another example," or "in another implementation" as used herein does not necessarily refer to a different embodiment, although it may. Thus, as described throughout, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, the meaning of "a," "an," and "the" include plural references. Further, plural references should be interpreted as also disclosing singular references. The meaning of "in" includes "in" and "on." Also, the use of "when" and "responsive to" do not imply that associated resultant actions are required to occur immediately or within a particular time period. Instead, they are used herein to indicate actions that may occur or be performed in response to one or more conditions being met, unless the context clearly dictates otherwise. Additionally, throughout the specification, the use of "exemplary" does not imply that other embodiments do not perform as well or are not as worthy of illustration. Instead, the term is used herein to emphasize that each element or function described by the term is an example element or function.

All of the embodiments and methods disclosed and claimed herein can be made and executed without undue experimentation in light of the present disclosure. While the preferred embodiment of the invention has been illustrated and described, as noted above, many changes can be made without departing from the spirit and scope of the invention. For example, cable harness 100 has been described as a passive pass-through device, yet, in some example implementations, cable harness 100 may include active circuitry (for example, circuitry that changes or supplements the output applied to female connector 104 or one or more of branch wires 108 or supplemental wires 100 based on one or more inputs obtained via male connector 102, internal sensors, or internally stored information). As another example, connector 102 may be female, connector 104 may be male, or either or both may be both male and female. As a further example, one or more portions of cable harness 100 (for example, one or more portions of one or more of male connector 102, female connector 104, main wires 106, branch wires 108, supplemental wires 110, or the like) may be entirely or partially housed in a container that provides a physically back-to-back connection such that, when cable harness 100 is inserted into a factory-installed female connector, female connector 104 extends directly from the female-installed female connector (for example, tubular structures 202, 204a, 204b may be omitted or instead housed in the container; as another example, one or more portions of one or more of main wires 106, branch wires 108, or supplemental wires 110 may be embodied as traces on a circuit board or the like in the container; as a further example, branch wires 108 may provide the branch connections via one or more ports in the container, such as one or more ports in one or more sides of the container, that may be manually selected or reconfigured based on the pinout definition adhered to by the factory-installed female connector or that may be automatically selected or reconfigured by internal circuitry of cable harness 100 or a device connected via the branch connection, such as by listening to outputs obtained from the factory-installed female connector via various wire connection mechanisms and subsequent comparison to one or more portions of information stored in memory). Moreover, each disclosed feature or element can be omitted or can be implemented in cable harness 100, process 300, or process 400 in addition or alternative to each other disclosed feature, unless clearly described otherwise. Accordingly, the scope of the invention is not limited by the disclosure of the preferred embodiment. Instead, the invention should be determined entirely by reference to the claims that follow.

What is claimed as new and desired to be protected by Letters Patent of the United States is:

1. A cable harness, comprising:
   a female connector having a plurality of pins;
   a male connector having a plurality of pins, each of the pins of the male connector corresponding to a respective one of the pins of the female connector;
   a plurality of main wires, each of the main wires electrically coupling a respective one of the pins of the male connector to the corresponding respective one of the pins of the female connector; and a plurality of branch wires, each of the branch wires electrically coupling to a respective one of the main wires via a respective T-splice, a first pair of the branch wires providing a branch connection to a first Controller Area Network (CAN) bus wire combination, a second pair of the branch wires providing a branch connection to a second CAN bus wire combination.

2. The cable harness of claim 1, further comprising one or more supplemental wires, each of the one or more supplemental wires having greater longitudinal length than each of the main wires, each of the one or more supplemental wires being free from immediate mechanical coupling to any of the pins of the male connector and being free from immediate mechanical coupling to any of the pins of the female connector.

3. The cable harness of claim 1, further comprising a mounting plate, the mounting plate removably coupling to the female connector.

4. The cable harness of claim 1, further comprising one or more tubular structures disposed around one or more of the main wires or the branch wires.

5. The cable harness of claim 1, further comprising:
a branch wire pair that includes a branch chassis-ground wire and a branch constant-voltage wire, the branch chassis-ground wire providing a branch connection to a chassis-ground wire in the main wires, the branch constant-voltage wire providing a branch connection to a constant-voltage wire in the main wires; and
a fuse holder connected in line with the branch constant-voltage wire.

6. The cable harness of claim 1, wherein a third one or more of the branch wires provides a branch connection to a third one or more CAN bus wires.

7. The cable harness of claim 1, wherein the first pair of the branch wires includes a first branch wire and a second branch wire, the first branch wire electrically coupling to a first main wire of the main wires, the second branch wire electrically coupling to a second main wire of the branch wires, the first main wire electrically coupling pin 6 of the female connector to pin 6 of the male connector, the second main wire electrically coupling pin 14 of the female connector to pin 14 of the male connector,
wherein the second pair of the branch wires includes a third branch wire and a fourth branch wire, the third branch wire electrically coupling to a third main wire of the main wires, the fourth branch wire electrically coupling to a fourth main wire of the branch wires, the third main wire electrically coupling pin 3 of the female connector to pin 3 of the male connector, the fourth main wire electrically coupling pin 11 of the female connector to pin 11 of the male connector, and
wherein a third fifth branch wire provides a third branch CAN bus connection, the fifth branch wire electrically coupling to a fifth main wire of the main wires, the fifth main wire electrically coupling pin 1 of the female connector to pin 1 of the male connector.

8. A method of making a cable harness, the method comprising:
providing a female connector having a plurality of pins;
providing a male connector having a plurality of pins, each of the pins of the male connector corresponding to a respective one of the pins of the female connector;
electrically coupling each of a plurality of main wires to a respective one of the pins of the male connector and to the corresponding respective one of the pins of the female connector; and
electrically coupling each of a plurality of branch wires to a respective one of the main wires via a respective T-splice, a first pair of the branch wires providing a branch connection to a first Controller Area Network (CAN) bus wire combination, a second pair of the branch wires providing a branch connection to a second CAN bus wire combination.

9. The method of claim 8, further comprising mechanically coupling one or more supplemental wires to one or more of the female connector, male connector, main wires, or branch wires, each of the one or more supplemental wires having greater longitudinal length than each of the main wires, each of the one or more supplemental wires being free from immediate mechanical coupling to any of the pins of the male connector and being free from immediate mechanical coupling to any of the pins of the female connector.

10. The method of claim 8, further comprising removably coupling a mounting plate to the female connector.

11. The method of claim 8, further comprising entirely or partially covering one or more of the main wires or the branch wires with one or more tubular structures.

12. The method of claim 8, further comprising:
electrically coupling a branch wire pair to the main wires, the branch wire pair including a branch chassis-ground wire and a branch constant-voltage wire, the branch chassis-ground wire providing a branch connection to a chassis-ground wire in the main wires, the branch constant-voltage wire providing a branch connection to a constant-voltage wire in the main wires; and
connecting a fuse holder in line with the branch constant-voltage wire.

13. The method of claim 8, wherein a third one or more of the branch wires provides a branch connection to a third one or more CAN bus wire combination.

14. The method of claim 8, wherein the first pair of the branch wires includes a first branch wire and a second branch wire, the first branch wire electrically coupling to a first main wire of the main wires, the second branch wire electrically coupling to a second main wire of the branch wires, the first main wire electrically coupling pin 6 of the female connector to pin 6 of the male connector, the second main wire electrically coupling pin 14 of the female connector to pin 14 of the male connector,
wherein the second pair of the branch wires includes a third branch wire and a fourth branch wire, the third branch wire electrically coupling to a third main wire of the main wires, the fourth branch wire electrically coupling to a fourth main wire of the branch wires, the third main wire electrically coupling pin 3 of the female connector to pin 3 of the male connector, the fourth main wire electrically coupling pin 11 of the female connector to pin 11 of the male connector, and
wherein a third fifth branch wire provides a third branch CAN bus connection, the fifth branch wire electrically coupling to a fifth main wire of the main wires, the fifth main wire electrically coupling pin 1 of the female connector to pin 1 of the male connector.

15. A method of using a cable harness, the method comprising:
providing a cable harness, the cable harness comprising:
a first female connector having a plurality of pins;

a male connector having a plurality of pins, each of the pins of the male connector corresponding to a respective one of the pins of the first female connector;

a plurality of main wires, each of the main wires electrically coupling a respective one of the pins of the male connector to the corresponding respective one of the pins of the first female connector; and a plurality of branch wires, each of the branch wires electrically coupling to a respective one of the main wires via a respective T-splice, a first pair of the branch wires providing a branch connection to a first Controller Area Network (CAN) bus wire combination, a second pair of the branch wires providing a branch connection to a second CAN bus wire combination;

removing a second female connector from a position in a vehicle, the second female connector complying with the SAE J1962 standard, the second female connector having a plurality of pins, one pair of the pins of the second female connector providing an end-of-network connection to a CAN bus in the vehicle;

inserting the male connector of the cable harness into the second female connector, each of the pins of the second female connector electrically coupling to a respective one of the pins of the male connector;

installing the first female connector of the cable harness at the position in the vehicle; and electrically coupling an electronic device to one of the first pair of the branch wires of the cable harness or the second pair of the branch wires of the cable harness based on one or more of a year, manufacturer, or model of the vehicle to communicably couple the electronic device the CAN bus in the vehicle.

16. The method of claim 15, wherein the cable harness further comprises a mounting plate removably coupled to the first female connector, wherein installing the first female connector of the cable harness comprises fastening the mounting plate of the cable harness to the vehicle.

17. The method of claim 15, wherein the cable harness further comprises a mounting plate removably coupled to the first female connector, wherein installing the first female connector of the cable harness comprises:

removing the mounting plate from the first female connector; and inserting the first female connector into a vacant space in the vehicle, the vacant space being disposed at the first position.

18. The method of claim 15, wherein:

the cable harness further comprises:

a branch wire pair that includes a branch chassis-ground wire and a branch constant-voltage wire, the branch chassis-ground wire providing a branch connection to a chassis-ground wire in the main wires, the branch constant-voltage wire providing a branch connection to a constant-voltage wire in the main wires; and a fuse holder connected in line with the branch constant-voltage wire; and the method further comprises:

electrically coupling the electronic device to the branch wire pair to power the electronic device.

19. The method of claim 15, further comprising inserting a second male connector of a diagnostic tool into the first female connector of the cable harness.

20. The method of claim 15, wherein the electronic device includes a collision avoidance system.

* * * * *